United States Patent [19]
Pirio et al.

[11] Patent Number: 5,532,861
[45] Date of Patent: Jul. 2, 1996

[54] OPTICAL FIBER TRANSMISSION SYSTEM WITH COMPENSATION FOR LINE DISTORTIONS

[75] Inventors: Francis Pirio; Jean-Baptiste Thomine, both of Paris, France

[73] Assignee: France Telecom, Paris, France

[21] Appl. No.: 268,484

[22] Filed: Jun. 30, 1994

[30] Foreign Application Priority Data

Jul. 16, 1993 [FR] France ................... 93 08539

[51] Int. Cl.[6] ................................. H04B 10/00
[52] U.S. Cl. .................. 359/161; 359/173; 359/179; 385/122
[58] Field of Search ................... 359/160–161, 359/173, 179, 188, 195, 341; 372/33; 385/122

[56] References Cited

U.S. PATENT DOCUMENTS

| 5,035,481 | 7/1991 | Mollenauer | 359/188 |
| 5,243,613 | 9/1993 | Gysel et al. | 372/33 |
| 5,355,240 | 10/1994 | Prigent et al. | 359/173 |
| 5,357,364 | 10/1994 | Gordon et al. | 359/173 |

FOREIGN PATENT DOCUMENTS

| 0338863 | 10/1989 | European Pat. Off. |
| 5107573 | 4/1993 | Japan . |

OTHER PUBLICATIONS

"Nonlinear Fiber Optics", Quantum Electron, by Govind Agrawal.
"Nonlinear Effects in Optical Fibres and Fibre Devices", IEE Proceedings, vol. 134, Pt. J. No. 3, Jun. 1987.
"Recent Research and Development Activities on Optical Submarine Cable Systems Using Optical Amplifiers at KDD", L'Onde Electrique, Mar.–Apr. 1993, vol. 73, pp. 15–23.

Primary Examiner—Leo Boudreau
Assistant Examiner—Kinfe-Michael Negash
Attorney, Agent, or Firm—Kinney & Lange

[57] ABSTRACT

A system for transmission of a digital signal on a transmission line with an optical on-line amplification. The transmission line is formed by a plurality of optical fiber sections and a plurality of optical amplifiers. Each of the optical amplifier is interposed between two adjacent optical fiber sections. The system includes at least one device for on-line compensation of the distortions induced in the digital signal, notably by the noise and the propagation on the transmission line. The on-line compensation device includes at least one bandpass optical filter having a passband whose value is substantially lower than that of the passband of the digital signal before transmission, and at least one saturable absorbent element that is a non-linear passive optical element having an absorption that depends decreasely on the optical power.

15 Claims, 4 Drawing Sheets

OPTICAL FIBER TRANSMISSION SYSTEM WITH COMPENSATION FOR LINE DISTORTIONS

BACKGROUND OF THE INVENTION

1. Field of the Invention

The field of the invention is that of digital transmission at very long distances (several thousands of kilometers) on optical fibers, in systems using line optical amplification.

In very long distance systems such as these, one of the main factors limiting the bit rate is the distortion induced by the transmission fiber.

Indeed, while these distortions can be generally overlooked in standard optical fiber systems (providing links of the order of some hundreds of kilometers), they become highly disturbing factors in long-distance transmission systems.

The invention relates to a system of transmission on an optical fiber line enabling compensation, on line, for this distortion induced by the transmission line in the case of transmission lines having a length of at least a thousand kilometers such as those used for transoceanic links.

2. Description of the Prior Art

The distortion provided by the transmission fiber arises out of the combined existence of two phenomena that occur in monomode fibers: chromatic dispersion and non-linear effects.

The first phenomenon is that of chromatic dispersion. This phenomenon arises out of the frequency dependence of the refractive index of silica. It results in propagation times that differ according to the operating wavelength. Generally, the chromatic dispersion tends to widen the pulses of the digital trains and, therefore, to create inter-symbol interference.

In the commonly used fibers, the chromatic dispersion is zero around 1.3 μm and takes a positive value of about 17 ps/nm/km around 1.55 μm. It is also possible to use fibers with offset dispersion that are designed to have zero chromatic dispersion in the region of 1.55 μm.

Very long distance systems (covering distances of several thousands of kilometers) work at 1.55_m. The excessive value of the chromatic dispersion, at this wavelength, of the commonly used fibers rules out their use, and in this case therefore it will be fibers with offset dispersion that are used.

It must be noted that the effect of distortion by chromatic dispersion depends greatly on the spectral components of the pulses: if a pulse has optical phase variations that are positive at its beginning and negative at its end, it will be greatly widened by a positive chromatic dispersion. The converse is true for negative dispersions.

Finally, the chromatic dispersion induces distortions that are independent of the optical power.

The second phenomenon relates to non-linear effects. The most important non-linear effect in a fiber is the Kerr effect. This effect, which is described for example in K.W. Blow and J. J. Doran, "Non-linear effects in optical fibers and fiber devices" (IEEE Proceedings, June 1987, pp. 138–144), expresses a linear dependence of silica with respect to the optical power.

This effect is very low in the usual fields of operation of optical systems (at distances smaller than about 400 km and at power values lower than about 10 mW), but becomes non-negligible for very high power values (of the order of 1 W) or for very great distances of propagation at moderate power values (some hundreds of kilometers in a system using periodic amplification).

When there is no chromatic dispersion, the Kerr effect induces a phase self-modulation of the optical pulse: the phase diminishes at the start of the pulse and then increases at its end, proportionally to the optical power. This induces a widening of the optical spectrum and a spectral composition that promotes a major degree of widening for negative chromatic dispersion.

In long-distance amplified systems, the distortion provided by the transmission fiber should therefore be considered to be the combination of the chromatic dispersion (the first phenomenon) and of the non-linear effects (second phenomenon).

The combination of these two effects may be described by a non-linear equation with partial derivatives in distance and in time known as Schrödinger's non-linear equation, the resolution of which is discussed notably in G. Agrawal, "Non-linear Fiber Optics", Academic Press.

The numerical and analytic study of this equation show that there are two types of behavior that are qualitatively very different depending on the sign of the chromatic dispersion (D) and the shape of the pulses.

The first type of behavior corresponds to D>0. In this case, the Kerr effect and the chromatic dispersion have opposite effects on the transmitted pulses. In general, this leads to phenomena known as "modulation instability" phenomena: the pulses "burst" into very short pulses after 1,000 to 2,000 km and the optical spectrum widens considerably. This may lead to problems relating to the optical passband. There also exist, in this type of behavior, pulses of a particular type known as solitons which, being defined precisely by their temporal and spectral shape and their peak power, have the property of getting propagated without any modification of shape.

The second type of behavior corresponds to D<0. In this case, there is no modulation instability and the pulses retain a certain degree of integrity while the spectrum widens monotonically during the propagation in keeping reasonable widths. However, the pulses widen greatly in the course of time. This creates inter-symbol interference. This interference, which depends increasingly on the absolute value of the chromatic dispersion, thus greatly restricts the acceptable range of chromatic dispersion in this field.

Already, for very long distance (6,000 to 9,000 km) amplified underwater systems, working at a bit rate of 5 Gbit/s,, the above-mentioned effects are major effects and call for special precautions as regards the signal wavelength, the output power of the amplifiers and the choice or arrangement of the line fibers according to their chromatic dispersion. The range of operation chosen is then that of the quasi-zero negative chromatic dispersion (D<0) with a so-called NRZ modulation format (intensity modulation, direct detection).

Consequently, for the designing of systems having a similar length but an even higher bit rate (10 Gbit/s and more), the above-mentioned propagation effects become crucial and highly restrictive. The designers are then faced with an ad hoc choice over the field of chromatic dispersion: namely chromatic dispersion that is either negative or positive.

Indeed, when the chromatic dispersion is almost zero and slightly negative, the field of operation in terms of wavelength is further reduced with a certainty that the manufacturing constraints will be more severe as regards the line and the transmission/reception elements.

For a chromatic dispersion value such as this that is almost zero, all the known methods of compensation for distortion introduced by the transmission line implement either compensation at transmission or compensation at reception. All these known methods therefore have the major drawback of not allowing the temporal and spectral reshaping of the pulses. Consequently, these known methods do not make it possible to prevent an exaggerated widening of the pulses which prompts inter-symbol interference.

In any case, it would appear to be extremely difficult to obtain a bit rate of over 10 Gbit/s in the current state of the art.

Furthermore, should the chromatic dispersion be positive and should the pulses be solitons, these solitons have the advantage of not getting deformed during propagation and are therefore immune to propagation distortions. However, these solitons-type pulses get mixed non-linearly with the noise put out by the amplifier. This produces a temporal jitter at reception (known as a Gordon-Haus jitter) which is a source of levels of error. If this jitter alone is considered, the limitations on bit rate in systems using solitons at very long distances (6,000 to 9,000 km) are in the range of 5 Gbit/s,. In order to increase the bit rate despite this jitter, several approaches have been proposed.

Two first known approaches are based on multiplexing techniques (wavelength multiplexing in one approach and polarization multiplexing in the other).

Two other known approaches, which seek to reduce the jitter itself in order to increase the maximum monochannel bit rate, implement an on-line control. One approach implements a control by filtering which consists in placing relatively narrow optical filters on the line. The other approach implements a control by modulation in which an on-line optical remodulation is carried out on the train of solitons at the clock frequency. This approach therefore implies the use of high frequency modulators in the line.

The latter two methods have drawbacks. For the on-line filtering, the reduction of jitter depends on the spectral narrowness of the filter. Now, the narrowness of this filter cannot be increased to an exaggerated extent for the necessary extra gain associated therewith then leads to a very substantial increase in the noise given by the amplifiers. A so-called "sliding filter" has been proposed. This consists in making the center frequency of the filters slide all along the line. This method gives good results in the laboratory but appears to be difficult to implement in a system because the frequency shift is very low (some hundreds of MHz) as compared with the width of the filter (about a hundred GHz) and is therefore very difficult to achieve on an industrial scale. For the on-line modulation, the restriction arises rather out of the on-line modulator component and its electronic circuitry which has to work at very high speeds and requires electrical supply on the line. Finally, unlike filtering, modulation is not compatible with wavelength multiplexing.

The invention is aimed notably at overcoming these different drawbacks of the prior art.

More specifically, an aim of the invention is to provide a system capable of compensating for the distortions induced by a very long distance transmission line on optical fibers with on-line optical amplification.

Another aim of the invention is to provide a system such as this that is simple to implement, costs little, is reliable and requires neither any electrical supply on the line nor any precise setting of electronic modules.

It is also an object of the invention to provide a system such as this that makes it possible to envisage high monochannel bit rates (of over 10 Gbits/s) and is compatible with wavelength multiplexing.

Another aim of the invention is to provide a system such as this that can be used to stabilize the level of noise on the "0"s and the "1"s.

A complementary aim of the invention is to provide a system such as this that can be implemented with fibers that have almost zero (and below zero) chromatic dispersion and are associated with solitons as well as with fibers having positive chromatic dispersion.

Another aim of the invention is to provide a system such as this which, in the case of a transmission of solitons, has a very high rate of jitter reduction.

Another aim of the invention is to provide a system such as this making it possible, in the case of a positive chromatic dispersion, to obtain a temporal and spectral reshaping of the light pulses conveying the information.

SUMMARY OF THE INVENTION

These aims, as well as others that shall appear hereinafter, are achieved according to the invention by means of a system for the transmission of a digital signal on a transmission line with an optical on-line amplification, said transmission line being formed by a plurality of optical fiber sections and a plurality of optical amplifiers, each of said optical amplifiers being interposed between two adjacent optical fiber sections, said system comprising at least one device for the on-line compensation of the distortions induced in said digital signal, notably by the noise and the propagation on said transmission line, said on-line compensation device comprising:

firstly, at least one bandpass optical filter having a passband whose value is, give or take about one order of magnitude, comparable to the passband of said transmitted digital signal; and secondly, at least one saturable absorbent element that is a non-linear passive optical element having an absorption that depends decreasingly on the optical power.

Thus, the on-line compensation device which, as the case may be, can be inserted in several places, associates a saturable absorbent element and at least one bandpass optical filter.

The saturable absorbent element has two functions, namely:

firstly, it reshapes the pulses of the digital train both temporally and spectrally, notably by carrying out a differential attenuation of their lowest-power "tail-end" components, and secondly, it carries the differential attenuation of the low-power strays of the train (strays due to noise and to possible "leakages" of a part of the energy of the pulses), thus preventing their getting accumulated during propagation. In other words, the saturable absorbent element applies a differential gain to the train by attenuating the energy present in the "0"s to a greater extent than the energy present in the "1"s.

This reshaping makes it possible:

for given characteristics of the system (bit rate, line parameters, etc.) to widen the margins in terms of performance characteristics of the system;

to design novel systems using the invention with a higher monochannel bit rate than is the case in the prior art;

to design novel systems using the invention and a wavelength and/or polarization multiplexing of channels having a total capacity that is higher than the capacity permitted in the prior art.

The relatively narrow bandpass filtering of the optical signal is aimed at stabilizing the effect of the saturable absorbent element by limiting the spectral width of the pulses.

In a first advantageous embodiment of the invention, said compensation device has a saturable absorbent element and a bandpass optical filter that are adjacent.

In a second advantageous embodiment of the invention, said compensation device has a saturable absorbent element and at least two bandpass optical filters, said bandpass optical filters being distributed along said transmission line.

In this way, if the saturable absorbent element, by virtue of its being a particular component, is located at a given point, the associated filter constituted by the set of bandpass optical filters gets distributed along the line.

Advantageously, said absorbent element and said bandpass optical filter or filters is/are placed firstly upline with respect to a fiber section and, secondly, downline with respect to an optical amplifier.

Thus, in the case of a filter distributed along the line, each of the optical filters forming this distributed filter is located after an amplifier and carries out a weaker filtering than the one done by a single (non-distributed) filter. In this way, the adding up of these optical filters is equivalent to a narrower filter placed in the vicinity of the saturable absorbent element.

In a preferred embodiment of the invention, said optical fiber sections have a mean optical dispersion that is very slightly negative at the operating wavelength of the system.

According to an advantageous variant, said optical fiber sections have a mean chromatic dispersion that is positive at the operating wavelength of the system and said digital signal is sent out in the form of a train of solitons.

In this variant, the bandpass filtering enables the limiting of the temporal jitter. Furthermore, the saturable absorbent element enables the use of filters that are far narrower than those used in the prior art (and therefore makes it possible to further limit the temporal jitter by improving the quality of the filtering).

Advantageously, said saturable absorbent element has at least one of the following characteristics:

the ratio of the maximum optical power, in saturation, transmitted by said saturable absorbent element, when said absorption is the minimum on the one hand, to the minimum optical power, without saturation, transmitted by said saturable absorbent element when said absorption is the maximum on the other hand, is great;

at the input of the absorbent element, the peak power of the pulses forming said digital signal saturate said absorption of said saturable absorbent element;

the time taken, for said saturable absorbent element, to go from maximum absorption without saturation to minimum absorption with saturation and vice versa is shorter than the duration of each of the pulses forming said digital signal.

The ratio between the maximum optical power and the minimum optical power may be called contrast.

It is clear that the saturable absorbent element having these three characteristics is the most efficient one.

The to-and-fro time between the maximum saturation and the minimum saturation of the saturable absorbent element is advantageously chosen to be short so that:

after the passage of a saturating pulse, the absorption of the absorbent element rises again before the arrival of the next pulse; and at the arrival of a saturating pulse, the absorption of the absorbent element decreases rapidly and lets this pulse through as efficiently as possible.

Preferably, said saturable absorbent element is of the type having absorption saturated by the peak power of the pulses forming said digital signal, and the optical amplifier placed immediately upline with respect to said saturable absorbent element has means to adjust its output power.

In this way, the output power of the optical amplifier placed immediately upline with respect to the saturable absorbent element can be adapted to the power required at input of this saturable absorbent element.

Advantageously, said optical amplifier placed immediately upline with respect to said saturable absorbent element also has means to check its output power, said checking means activating said adjusting means.

Thus, it is possible to ensure that there are given mean power values at input of the saturable absorbent element and hence that there are performance characteristics that are constant in time.

Advantageously, said optical amplifier placed immediately upline with respect to said saturable absorbent element is preceded by an additional optical amplifier.

This corresponds to the case where the saturable absorbent element calls for saturation power values that, for example, are ten times higher than those at output of standard line amplifiers. The additional optical amplifier thus makes it possible to increase the power to the requisite level.

Advantageously, an optical attenuator is placed downline with respect to said saturable absorbent element.

This makes it possible, if need be, to reduce the power at the input of the fiber to a lower requisite level.

Preferably, said digital signal is encoded according to the RZ binary format.

Advantageously, said bandpass optical filter or filters belong to the group comprising:

optical filters made by interference layers;

optical filters made according to the Fabry-Pérot principle.

Advantageously, said saturable absorbent element is made out of semiconductor superlattices of the In Ga As, Ga As type for example.

BRIEF DESCRIPTION OF THE DRAWINGS

Other features and advantages of the invention shall appear from the following description of a preferred embodiment of the invention, given by way of a non-restrictive example, and from the appended drawings, of which:

FIGS. 5A, 5B and 5C each show a curve of variation of the optical power as a function of time for one and the same pulse located at different points of the transmission line of a system according to the invention, namely respectively:

before the compensation device;

after the saturable absorbent element and before the bandpass optical filter;

after the compensation device;

MORE DETAILED DESCRIPTION

The invention therefore relates to a system for the very long distance transmission of a digital signal between a transmission station and a reception station. This transmission station and this reception station are connected by an optical fiber transmission line with on-line optical amplification.

Figure 1:
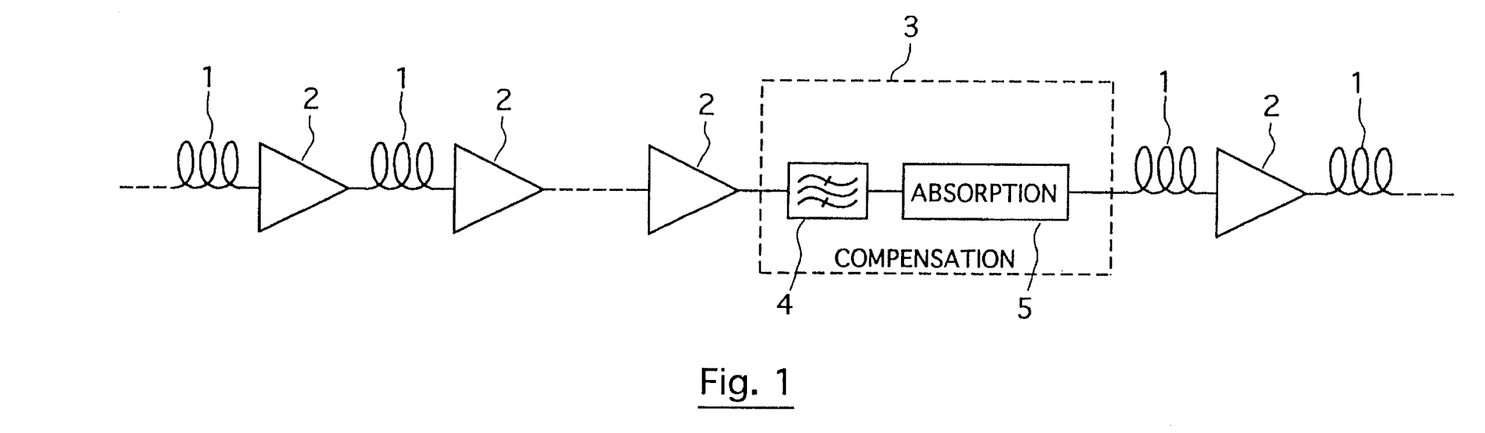
FIGS. 1 and 2 each show a transmission line and a distinct embodiment of a compensation device implemented in a transmission system according to the invention.
Figure 2:
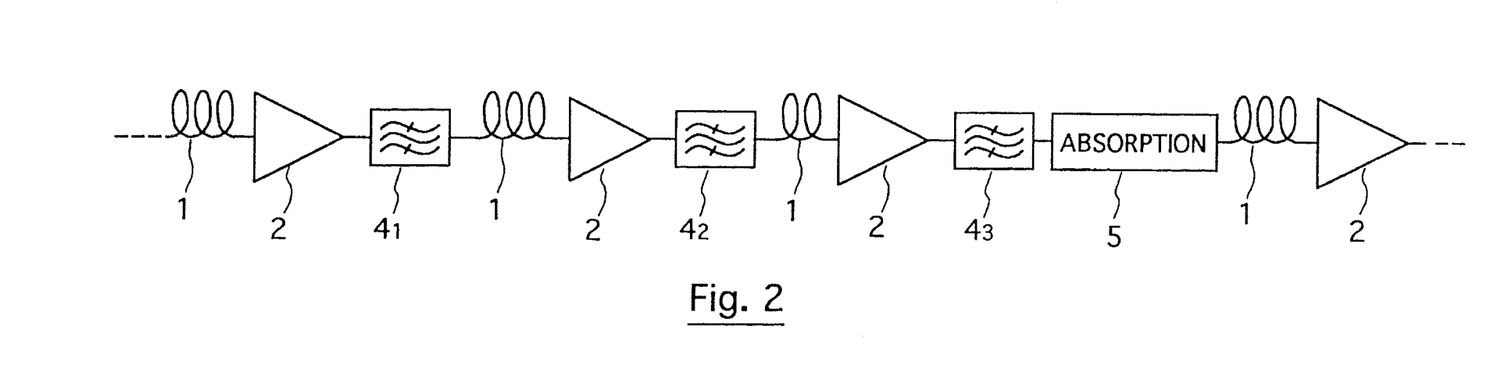

FIG. 1 and 2 each show a transmission line such as this as well as a distinct embodiment of a device for the on-line compensation of the distortions induced on the digital signal notably by the noise and the propagation on the transmission line.

The transmission line has a plurality of optic fiber sections 1, two consecutive fiber sections being separated by an optical amplifier 2.

In the first embodiment shown in FIG. 1, the on-line compensation device 3 comprises:

firstly, a bandpass optical filter 4 having a passband whose value is, give or take about one order of magnitude, comparable to the band of the transmitted signal; and secondly, a saturable absorbent element 5 that is a non-linear passive optical element.

Thus, the passband of the bandpass optical filter 4 is, for example, equal to or greater than (up to 20 times greater than) the band of the transmitted signal.

In this example, the compensation device 3 is localized at a fixed point of the transmission line. More specifically, the compensation device is placed upline with respect to a fiber section 1 and downline with respect to an optical amplifier. In this FIG. 1, the filter 4 is placed upline with respect to the saturable absorbent element 5. It must be noted however that the order between these two elements 4, 5 constituting the compensation device 3 is different.

The second embodiment shown in FIG. 2 differs from the first embodiment shown in FIG. 1 solely in that the bandpass filtering is done not by one filter only but by a plurality of bandpass optical filters $4_1$ to $4_3$ distributed along the transmission line. The distribution of these filters $4_1$ to $4_3$ is done for example so that each bandpass filter placed downline with respect to an amplifier 2 filters less strongly than a single filter. Thus, the adding up of these filters $4_1$ to $4_3$ is equivalent to a narrower filter placed close to the saturable absorbent element.

In these two embodiments of the compensation device of the invention, the bandpass optical filters may be made, for example, with interference layers or according to the Fabry-Pérot principle. Furthermore, the saturable absorbent element is made, for example, with semiconductor superlattices, notably of the In Ga As, Ga As type.

Figure 3:
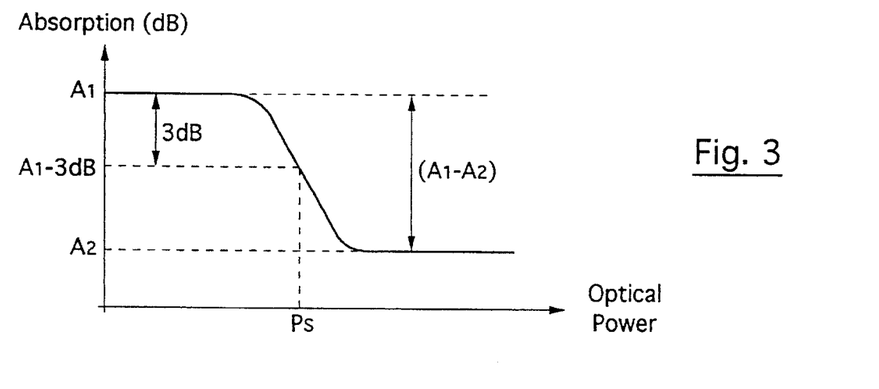
FIG. 3 gives and exemplary curve of variation, as a function of the optical power, of the absorption of a saturable absorbent element implemented in the system of the invention.

FIG. 3 exemplifies a curve of variation, as a function of optical power, of the absorbent of the saturable absorbent element 5. This absorption depends in a rapidly decreasing way on the optical power and has two substantially constant levels of absorption: one absorption level $A_1$ for the low optical power values and one absorption level $A_2$ for the high optical power values. On this curve, the saturation power $P_s$ is defined as the optical power for which the absorption is equal to $(A_1-3dB)$.

Figure 4A:
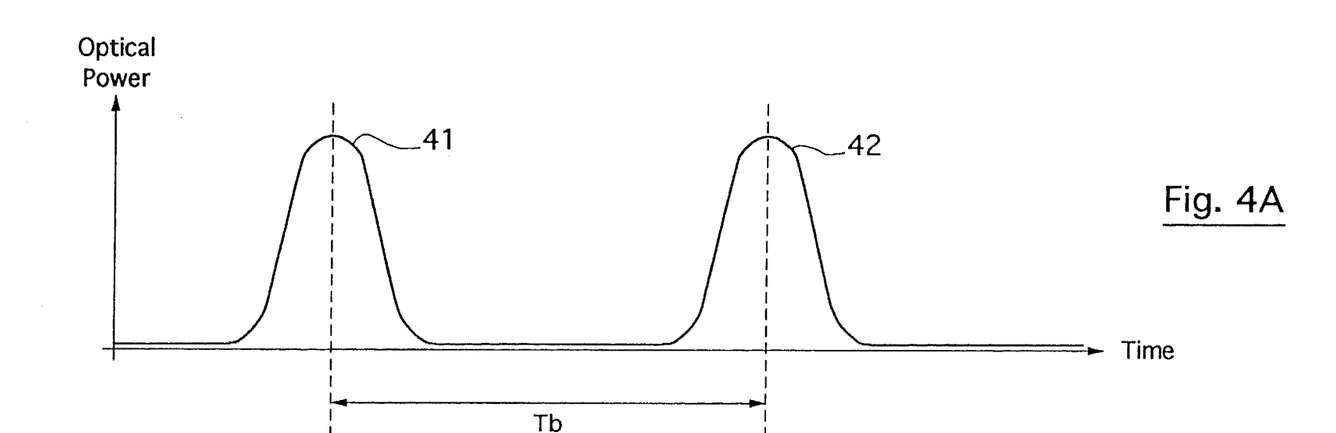
FIG. 4A gives a curve of variation, as a function of time, of the optical power for a portion of a binary train encoded to the RZ binary format and constituted by two consecutive "1"s.

The digital signal is transmitted in the form of a pulse wave. The FIG. 4A shows a curve of variation, as a function of time, of the optical power of a portion of a binary train encoded according to the RZ format and constituted by two consecutive pulses 41, 42. Each pulse 41, 42 corresponds to a binary element 1. The duration between two consecutive pulses is the bit time $T_b$.

Figure 4B:
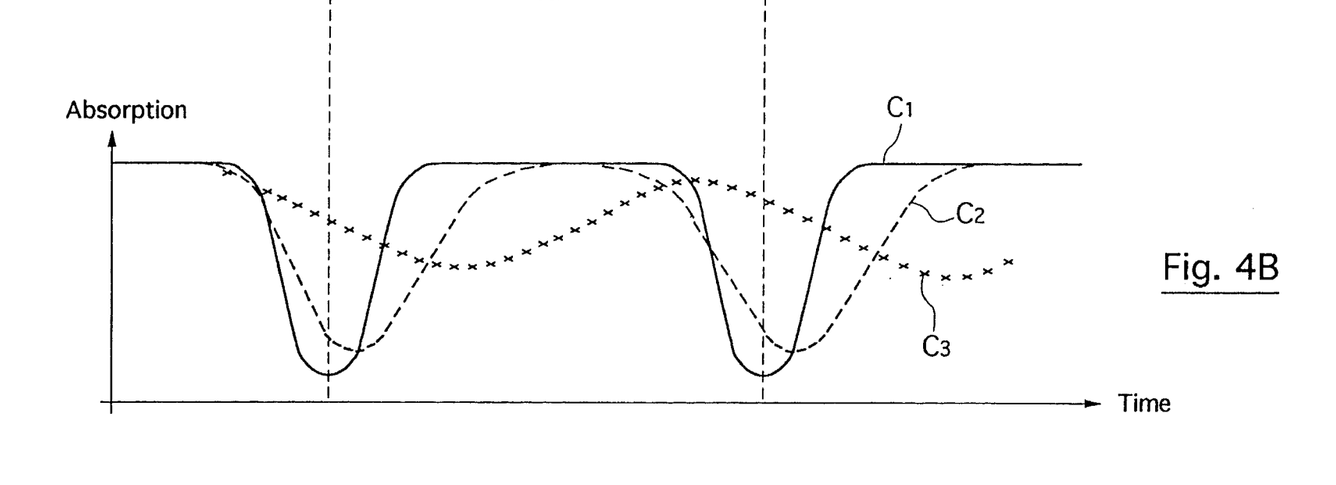
FIG. 4B gives three curves each showing the variations, as a function of time, of the absorption of a distinct saturable absorbent element when the signal that is applied to it is the signal shown in FIG. 4A.

FIG. 4B shows three curves $C_1$, $C_2$, $C_3$ each showing the variations, as a function of time, of the absorption of a distinct saturable absorbent element when the signal applied to it is the signal shown in FIG. 4A.

The first curve $C_1$ corresponds to the very favorable example of a saturable absorbent element with zero reaction time: the absorption varies inversely to the optical power and does so without delay. The to-and-fro time between maximum absorption without saturation and minimum absorption with saturation is short as compared with the transition time of the train (namely the bit time $T_b$).

The second curve $C_2$ corresponds to the less favorable but nevertheless acceptable case of a saturable absorbent element having a reaction time that is not zero but is sufficiently short. The absorption time varies inversely to the optical power and does so with a small delay.

The third curve $C_3$ corresponds to the unfavorable and unacceptable case of an absorption element having an excessively lengthy reaction time. The absorption varies inversely to the optical power and does so with a substantial delay.

Figure 5A:
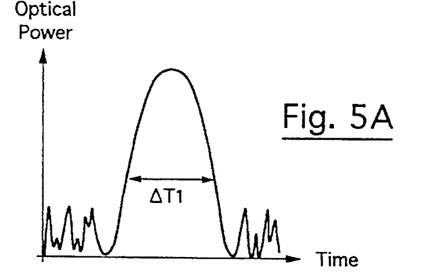
Figure 5B:
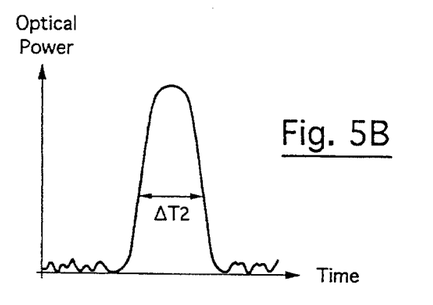
Figure 5C:
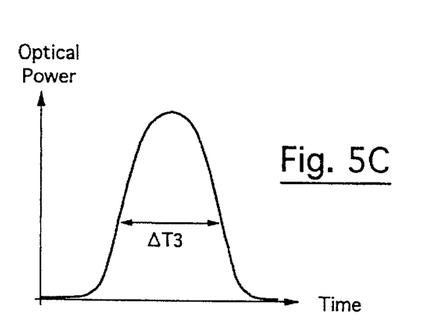
Figure 6A:
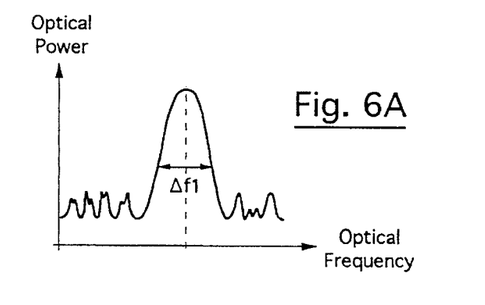
FIGS. 6A, 6B and 6C each show a curve of variation of the optical power as a function of the optical frequency for one and the same pulse located respectively at the points corresponding to FIGS. 5A, 5B and 5C.
Figure 6B:
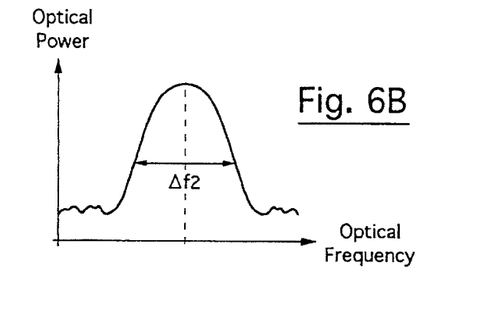
Figure 6C:
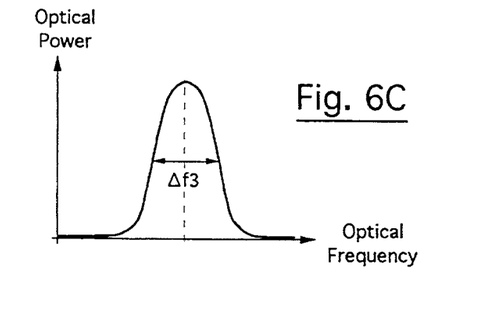

The action of the saturable absorption element and of the bandpass optical filter is presented, in the temporal field, in relation with FIGS. 5A, 5B and 5C and, in the frequency field., in relation with the FIGS. 6A, 6B and 6C.

FIGS. 5A and 6A each show a curve of variation of the optical power, as a function of the time and of the optical frequency respectively, of a pulse at a point of the line located before the compensation device. This pulse then has a temporal width and a spectral width $\Delta F_1$.

FIGS. 5B and 6B each show a curve of variation of the optical power, as a function of the time and the optical frequency respectively, of a pulse at a point of the line located after the saturable absorbent element and before the bandpass optical filter. The temporal width $\Delta T_2$ of the pulse has diminished ($\Delta T_2 < \Delta T_1$). The saturable absorbent element therefore has the role of improving the quality of the pulses by carrying out the differential attenuation of their tail-end components having the lowest power and of the low-power stray pulses due to the noise and to "leakages" if any of a part of the energy of the pulses. By contrast, the spectral width $\Delta F_2$ of the pulse has increased ($\Delta F_2 > \Delta F_1$).

FIGS. 5C and 6C each show a curve of variation of the optical power as a function of the time and the optical frequency respectively, of a pulse and a point of the line located after the compensation device. The spectral width $\Delta F_3$ of the pulse has diminished ($\Delta F_3 < \Delta F_2$). The passband optical filter therefore has the role of stabilizing the action of the saturable absorbent element by limiting the spectral width of the pulses. By contrast, the temporal width $\Delta T_3$ has increased ($\Delta T_3 > \Delta T_2$).

The most favorable case consists in having $\Delta T_3 \approx \Delta T_1$ and $\Delta F_1 \approx \Delta F_3$. Thus, the pulses are received without distortions It must be noted that the adding on of a power non-linear element such as the saturable absorbent element fundamentally changes the basic elements of the problems related to propagation. For, if the width of the filter and the saturation level of the absorbent element are appropriately chosen, the compensation device has a quasi-regenerating function since it re-improves the quality of the pulse both temporally and spectrally. Placed periodically in a long-distance system with the given characteristics, this compensation device leads to a periodic development of the pulse train. Thus even if, between two compensation devices, the pulses were to widen or narrow temporally or spectrally according to the parameters of the line, they would, as soon as they reached the next compensation device, be once again brought back to their state of equilibrium. This therefore ensures stable propagation throughout the line. Similarly, while the pulses at the input of the line do not correspond exactly to the state of equilibrium, they tend towards this state after passing through a part of the line and through a few compensation devices. The number of compensation devices and their exact characteristics may be defined, for example, by numerical simulation with the following general rule: a compensation device must be inserted before the system reaches a point of non-return (namely before the existence of inter-symbol interference between successive pulses or again before the appearance of substantial strays between the pulses).

In the case of systems using solitons, the choice of the characteristics of the filters is also related to the jitter-reduction level that is hoped for. It must also be noted that, in this example of solitons type pulses, the bandpass optical filter can also be used to limit temporal jitter. Furthermore, the saturable absorbent element enables the use of optical filters that are far narrower than those generally used. This enables the jitter to be further reduced.

It is clear that the compensation device does not call for any electrical supply on the line (unlike for example in the case of control by modulation), or any precise setting of the center frequency of the filters along the line (unlike notably the "sliding filter" method).

Finally, the saturable absorbent element is all the more efficient as:

the contrast $(A_1-A_2)$ in FIG. 3 is greater;

the peak power of the pulses really saturates its absorption;

the to-and-fro time between maximum saturation and minimum saturation is shorter than the time of the transmitted train.

Figure 7A:
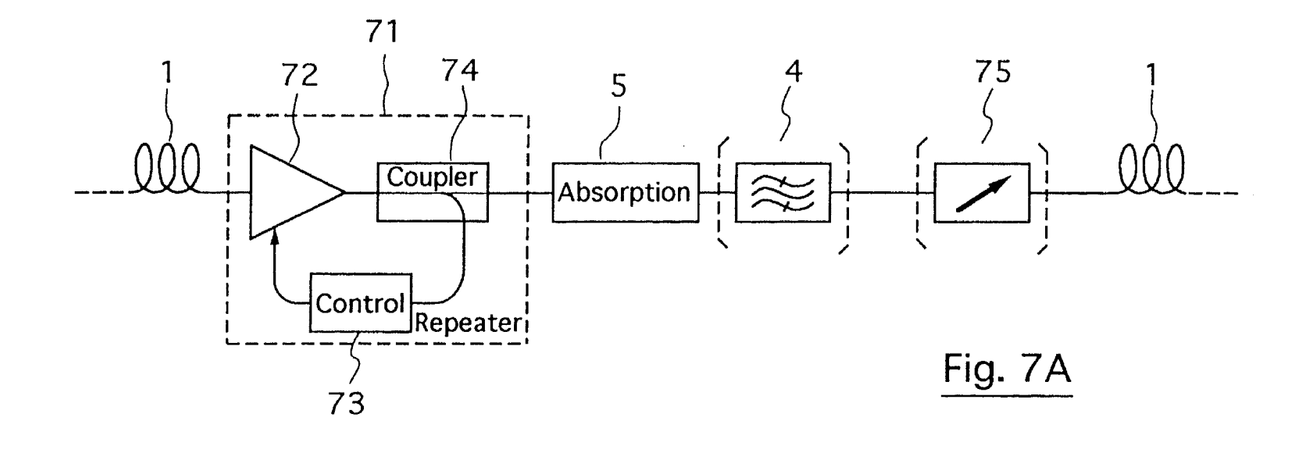
FIGS. 7A and 7B each show a distinct variant of the transmission system according to the invention shown in FIG. 1.
Figure 7B:
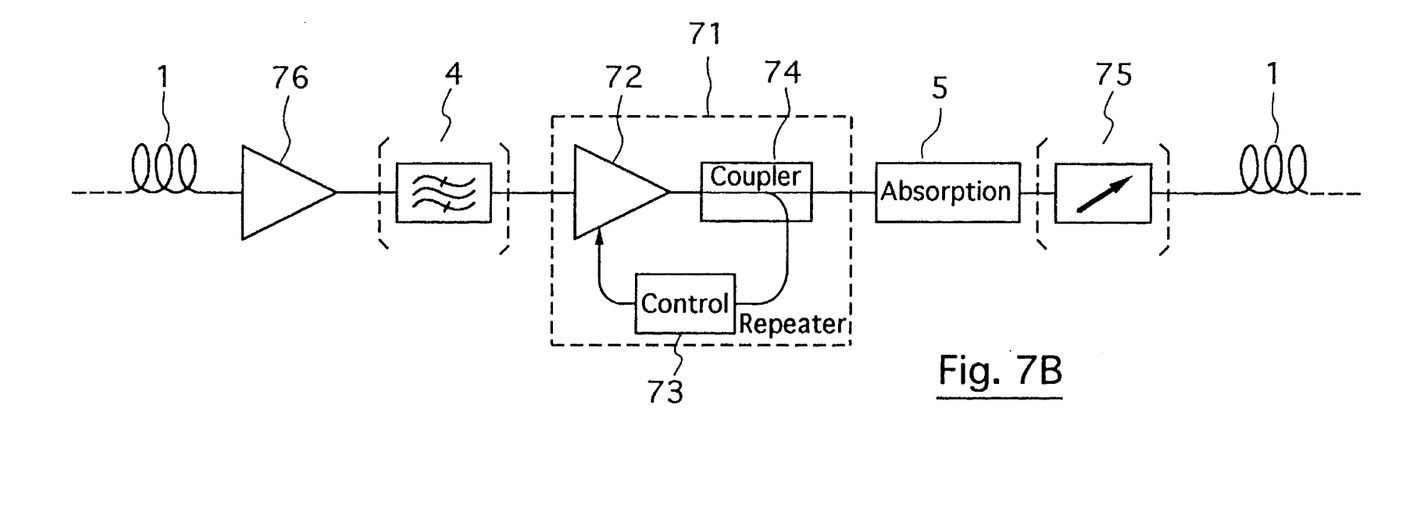

FIGS. 7A and 7B each show a distinct variation of the transmission system according to the invention shown in FIG. 1. These two variants are more specifically designed to ensure that the peak power of the pulses actually saturates the absorption of the saturable absorbent element.

Indeed, as shown in FIG. 7A, the normal optical amplifier placed immediately upline with respect to the saturable absorbent element 5 can be replaced by a particular optical repeater 71 comprising, firstly, an optical amplifier 72 integrating means (not shown) for adjusting its output power and, secondly, means 73 to check the output power of the optical amplifier 72. These checking means 73 are connected firstly to a coupler 74 that makes it possible to know the output power of the amplifier 72 and, secondly, to the means for adjusting this amplifier 72. This particular optical repeater 71 makes it possible to enter the saturable absorbent element with the requisite power. The checking means 73 even make it possible to ensure given mean power values at input of the saturable absorbent element and, therefore performance characteristics that are constant in time. Furthermore, the power at input of the fiber 1 section along the saturable absorbent element 5 can be reduced, if need be, to a required lower level by means of an optical attenuator 75 placed at output of the saturable absorbent element.

For example, by taking typical erbium-doped amplifiers, this type of configuration gives a gain of two to three magnitudes on the saturation level (an amplifier having a mean output level of −10 to +15 dBm). In this way, it is possible to use saturable absorbent elements with power characteristics that are relatively different from what is required from a line and propagation viewpoint.

FIG. 7B corresponds to the case where the saturable absorbent element requires even higher saturation power values, for example power values that are ten times higher than those at output of the standard line amplifiers. In this case, the repeater 71 placed immediately upline with respect to the absorbent element is preceded by an additional optical amplifier 76. There are thus two amplification stages that make it possible to increase the power to these requisite levels.

The rest of the description relates to the presenting of three results of the implementation of a transmission system according to the invention.

In these three results, the wavelength of operation is located in the amplification window of the erbium-doped fiber amplifiers (namely 1,528 nm to about 150 nm). The line fiber has an effective surface area of about 50 $\mu m^2$, a Kerr index of about $2.7 \ 10^{-20} \ m^2/\varsigma$, and an attenuation value of 0.2 dB/km approximately.

In the first case, the system uses the RZ modulation in the almost-zero chromatic dispersion mode and has the following characteristics:

RZ train modulated at 20 Gbit/s with pulses having a width at mid-height of 10 ps; and line constituted by fiber sections with offset chromatic dispersion of a mean value of −0.05 ps/nm/km at the wavelength of operation and a loss of 0.2 dB/km, and erbium-doped optical fiber amplifiers spaced out at distances of 40 km with a mean output power of 0 dBm and a noise factor of 6 dB.

Without a compensation device, the performance characteristics are very poor (it is impossible to retrieve the clock signal) after about 2,000 km.

If a compensation device constituted by a bandpass optical filter having a band of about 0.4 nm at 3 dB and a saturable absorbent element (saturation power of some milliwatts) are placed at intervals of 200 km (after an amplifier) and if an output power value of 0 dBm is maintained at the output of the compensation device, the train gets propagated up to 9,000 km while keeping excellent performance characteristic (with error rates far lower than $10^{-10}$ at 9,000 km).

In the second case, the system uses the RZ modulation in "soliton" propagation mode and has the following characteristics:

RZ train modulated at 20 Gbit/s with pulses having a width at mid-height of 10 ps; and line constituted by fiber sections with offset chromatic dispersion of a mean value of 0.22 ps/nm/km at the wavelength of operation and a loss of 0.2 dB/km, and erbium-doped optical fiber amplifiers spaced out at distances of 40 km with a mean output power of +3 dBm and a noise factor of 6 dB.

Without a compensation device, the performance characteristics are very poor (it is impossible to retrieve the clock signal) at 9,000 km. With a 1.5 nm band filter at 3 dB inserted after each amplifier, the performance characteristics are very poor (it is impossible to retrieve the clock signal) at 9,000 km. By inserting a saturable absorbent element (with a saturation power of some milliwatts) every 400 km (after an amplifier) and by keeping the filters, the train gets propagated while keeping excellent performance characteristics (with error rates far lower than $10^{-10}$ at 9,000 km).

In the third case, the system uses the RZ modulation in soliton propagation mode and has the following characteristics:

RZ train modulated at 40 Gbit/s with pulses having a width at mid-height of 5 ps; and line constituted by fiber with offset chromatic dispersion of a mean value of 0.11 ps/nm/km at the wavelength of operation and a loss of 0.2 dB/km, and erbium-doped optical fiber amplifiers spaced out at distances of 40 km with a mean output power of +5 dBm and a noise factor of 6 dB.

Without a device, the performance characteristics are very poor (it is impossible to retrieve the clock signal) starting from a distance of 2,000 km. With a 1.25 band filter at 3 dB inserted after each amplifier, the performance characteristics are very poor (it is impossible to retrieve the clock signal) starting from a distance of 3,000 km. By inserting (after each amplifier, i.e. every 40 km) a saturable absorbent element (with a saturation power of some milliwatts) while keeping the filters and by keeping an output power of +5 dBm (at the output of the compensation device this time), the train gets propagated while keeping excellent performance characteristic (with error rates far lower than $10^{-10}$ at 9,000 km).

What is claimed is:

1. A system for transmission of a digital signal having a given passband, on a transmission line with optical on-line amplification, said transmission line being formed by a plurality of optical fiber sections and a plurality of optical amplifiers, each of said optical amplifiers being interposed between two adjacent optical fiber sections, said system comprising at least one device for on-line compensation of distortions induced in said digital signal, notably by noise and propagation on said transmission line, said on-line compensation device comprising:

at least one bandpass optical filter having a passband whose value is substantially comparable to the passband of said digital signal, said at least one bandpass optical filter being interposed on-line between one of said optical fiber sections and one of said optical amplifiers; and at least one saturable absorbent element that is a non-linear passive optical element and having an absorption that depends decreasingly on optical power of said digital signal, time taken for said saturable absorbent element to go from maximum absorption without saturation to minimum absorption with saturation and vice-versa being shorter than duration of each of the pulses forming said digital signal, said at least one saturable absorbent element being interposed on-line between one of said optical fiber sections and one of said optical amplifiers.

2. A system according to claim 1, wherein said compensation device comprises a saturable absorbent element and a bandpass optical filter that are adjacent.

3. A system according to claim 1, wherein said compensation device comprises a saturable absorbent element and at least two bandpass optical filters, said bandpass optical filters being distributed along said transmission line.

4. A system according to claim 2, wherein each of said absorbent element and said bandpass optical filter is placed on-line firstly upline with respect to one of said fiber sections and secondly, downline with respect to the preceding optical amplifier.

5. A system according to claim 3, wherein each of said absorbent element and said bandpass optical filters is placed firstly upline with respect to one of said fiber sections and, secondly, downline with respect to the preceding optical amplifier.

6. A system according to claim 1, wherein said optical fiber sections have a mean optical dispersion that is very slightly negative at operating wavelength of said system.

7. A system according to claim 1, wherein said optical fiber sections have a mean chromatic dispersion that is positive at operating wavelength of said system and wherein said digital signal is sent out in the form of a train of solitons.

8. A system according to claim 1, wherein said saturable absorbent element has at least one of the characteristics belonging to the group comprising:

great ratio of maximum optical power, in saturation, transmitted by said saturable absorbent element, when said absorption is minimum on the one hand, to minimum optical power, without power, without saturation, transmitted by said saturable absorbent element when said absorption is maximum on the other hand;

at input of the absorbent element, peak power of the pulses forming said digital signal saturate said absorption of said saturable absorbent element.

9. A system according to claim 8 in which said saturable absorbent element is of the type having absorption saturated by the peak power of the pulses forming said digital signal, wherein the optical amplifier placed immediately upline with respect to said saturable absorbent element has means to adjust its output power.

10. A system according to claim 9, wherein said optical amplifier placed immediately upline with respect to said saturable absorbent element also has means to check its output power, said checking means activating said adjusting means.

11. A system according to claim 9, wherein said optical amplifier placed immediately upline with respect to said saturable absorbent element is preceded by an additional optical amplifier.

12. A system according to claims 9, wherein an optical attenuator is placed downline with respect to said saturable optical element.

13. A system according to claim 1, wherein said digital signal is encoded according to RZ binary format.

14. A system according to claim 1, wherein said bandpass optical filters belong to the group comprising:

optical filters made by interference layers;

optical filters made according to Fabry-Pérot principle.

15. A system according to the claim 1, wherein said saturable absorbent element is made out of semiconductor superlattices.

* * * * *

UNITED STATES PATENT AND TRADEMARK OFFICE
CERTIFICATE OF CORRECTION

PATENT NO. : 5,532,861
DATED : JULY 2, 1996
INVENTOR(S) : FRANCIS PIRIO, JEAN-BAPTISTE THOMINE

It is certified that error appears in the above-indentified patent and that said Letters Patent is hereby corrected as shown below:

Col. 1, line 33, after "in", delete ","

Col. 2, line 45, delete "kin", insert --km--

Col. 2, line 47, delete second occurrence ","

Col. 3, line 22, after "Gbit/s", delete "."

Col. 8, line 45, after the first occurrence of "width", insert $--\Delta T_1--$

Signed and Sealed this

Thirty-first Day of December, 1996

Attest:

BRUCE LEHMAN

*Attesting Officer*     *Commissioner of Patents and Trademarks*